June 30, 1942.  W. GAVETT  2,287,983
FILTER
Filed Feb. 23, 1939  4 Sheets-Sheet 2

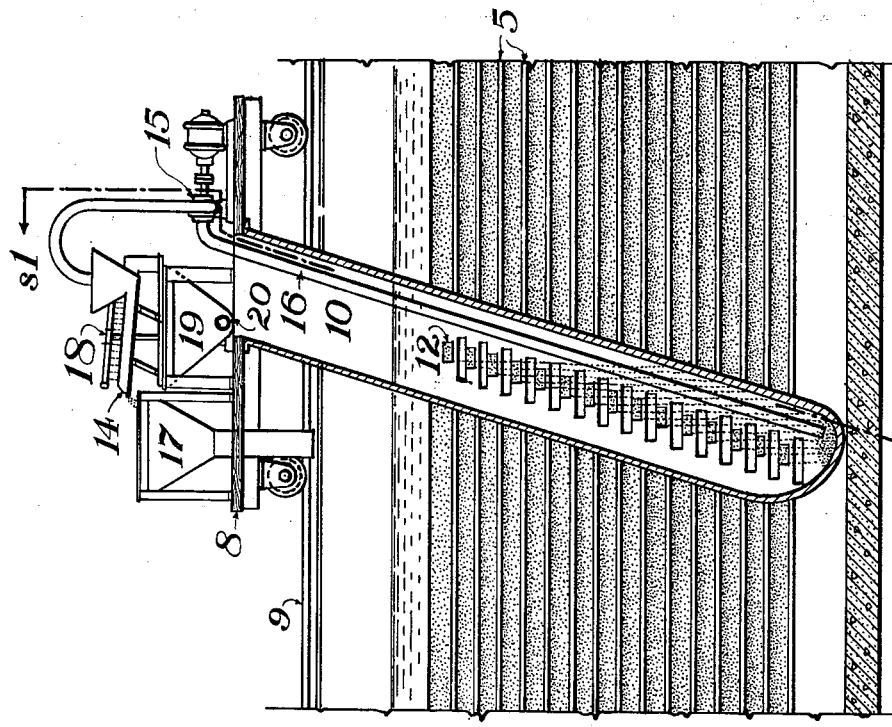
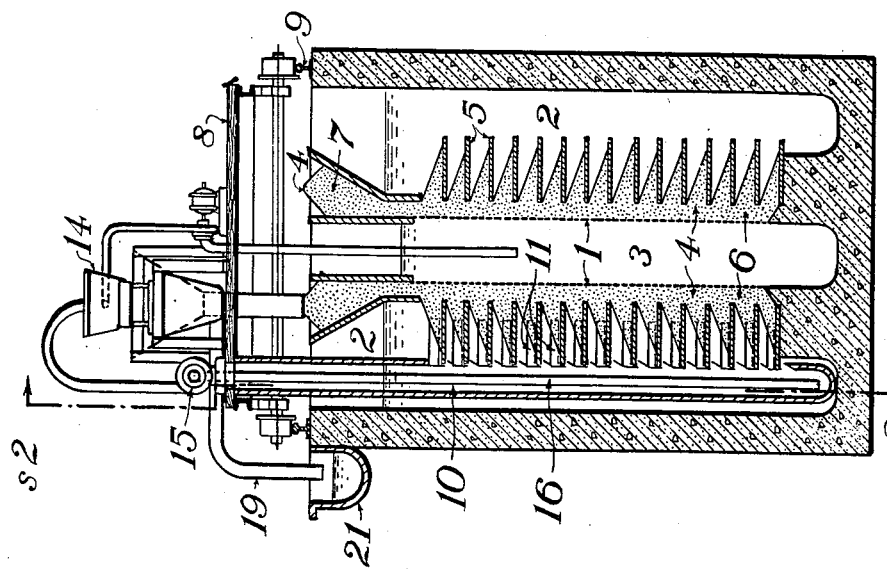
Fig. 2.
Fig. 1.

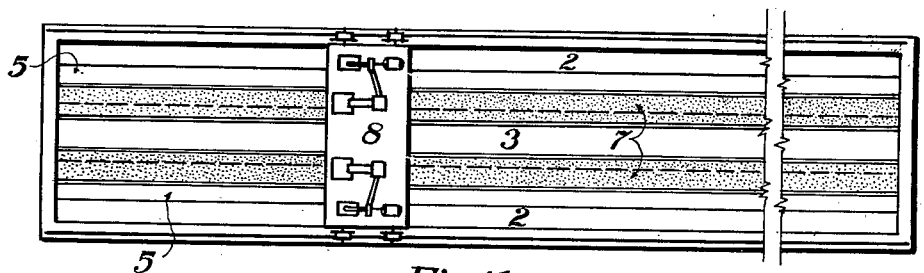
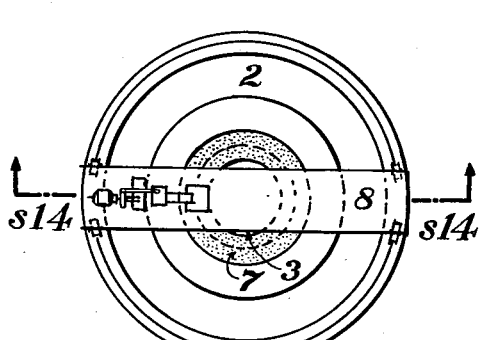
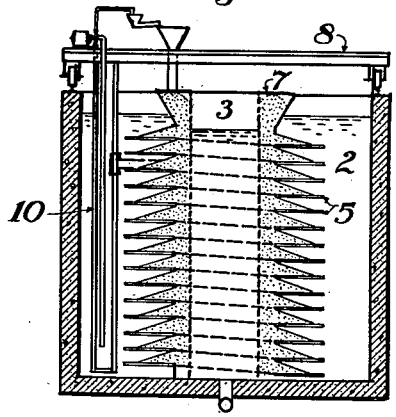
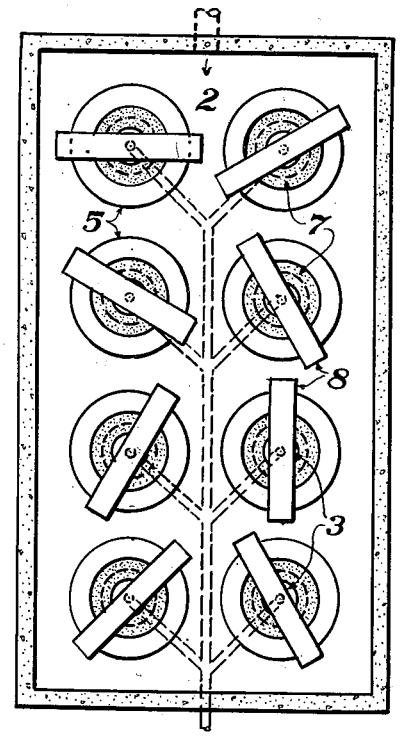
Fig. 7
Fig. 8
Fig. 9
Fig. 10

June 30, 1942. W. GAVETT 2,287,983
FILTER
Filed Feb. 23, 1939 4 Sheets-Sheet 4

Patented June 30, 1942

2,287,983

UNITED STATES PATENT OFFICE 2,287,983

FILTER

Weston Gavett, Plainfield, N. J.

Application February 23, 1939, Serial No. 257,951

17 Claims. (Cl. 210—128)

My invention relates to an improved filtering process and to apparatus suitable for carrying the process into effect. While the invention has a wide range of use, it is specially adapted, as herein disclosed, for the rapid and continuous filtration of liquids containing considerable quantities of suspended matter.

Rapid sand filters of the conventional types are not adapted for the filtration of such liquids as is evident from their use in water purification, in which it is necessary to remove the bulk of the suspended solids in coagulation basins in order to reduce the load on the filters. Washing sand filters of various types, in present day use, involves considerable time and labor and the filter must be cut out of service during the washing operation. To prevent waste, the contained water is allowed to filter down after the inlet valve is closed and this is followed by the laborious opening and closing of various valves until the cleaning is completed.

My invention avoids the necessity of removing the suspended solids, as a preliminary step in the filtering operation, by providing for either intermittent or continuous cleaning of the filter media while the filter is in service and without interrupting the filtering operation. As the depth of sand or other filter media employed, is dependent upon the quantity of solids deposited in periods of service between washings, I am enabled, by cleaning at frequent intervals or continuously, to use a filter bed that is much thinner than is employed in ordinary rapid sand filters and in thus reducing the quantity of material to be handled, lighter machinery and less power may be used, at a considerable saving in cost of installation and operation.

Mechanically cleaned filters now used have certain serious disadvantages that greatly reduce their efficiency. Where, for example, the cleaning element is of the type that rests directly on the surface of the sand bed, or in close relation thereto, it is difficult, if not impossible, to obtain a complete separation between the section of sand being washed and the surrounding unfiltered liquid in which the cleaning element is immersed. Such short circuiting causes a material increase in the quantity of wash water to be removed and correspondingly lengthens the time and labor required for cleaning. A further loss of efficiency occurs by unfiltered liquid passing into the filtered water chamber through the sand being washed. In some types of filters now in use, the entire depth of sand is not thoroughly cleaned and when sewage or similar liquids, subject to biological decomposition are being filtered, septic action follows in such portions of the filter as are insufficiently cleansed, resulting in an inferior effluent. In many cases the screen supporting the sand, becomes clogged with accumulated deposit, requiring frequent shutting down of the filter, removal of sand and cleaning of the screen, which involves a great deal of expense in time and labor, in addition to putting the filter out of service. As economy of space is important both in new installations and in adding filters to existing plants, difficulty is often experienced in providing sufficient area for filters of the types now available.

The present invention avoids the above mentioned and other objectionable features of present day filters by providing, in the preferred embodiment, for intermittent or continuous circulation of the sand or other filtering media in a direction opposite the flow of the liquid, which prevents accumulation or deposit of the solids to any appreciable depth therein, insures thorough cleansing and by forward feed of fresh, clean sand from the rear towards the exposed surface through which the liquid enters the filter media, the bed is given a self-clearing action for the free passage of the liquid. As the direction of movement of the sand is away from the filter screen, the natural tendency of the solids to accumulate and clog the screen, is avoided and the liquid has free and uninterrupted flow through the same. A further advantage is the accessibility of the screen which may be brushed or cleaned while the filter is in service. This cannot be done with other types of filters. An important contributing factor in the self-clearing action of the bed is provided by giving the exposed surface thereof a slope such as will tend to shed a large percentage of the solids settling thereon, causing them to drift down the slope by gravity. After separation from the solids, the contained sand may be returned to the filter as a fresh supply for the beds. To clear the sloping surface of the filter beds of such solids as deposit thereon, I provide for the removal and washing of the surface layer, to any depth required for thorough cleaning and for the forward feed of clean sand to restore and maintain the slope, following such removal. Economy in floor or ground space occupied by the filter is effected by developing the same vertically instead of horizontally. That is, by arranging the filter units in superimposed rows or tiers to any height required to give it the desired capacity, in which arrangement, each unit performs its complete function separately and independently of the others and the failure or break-down of one or more, has no effect whatever upon the continued operation of the remaining units.

Other points of merit not specially mentioned above, will be brought to attention in the detail description that follows.

The accompanying drawings will serve to illustrate apparatus suitable for carrying my invention into effect but I do not wish to be understood as intending to limit myself to the same, as various changes may be made in both the form and details without departing from the spirit and scope of the invention as outlined in the appended claims.

In the drawings—

Fig. 1 is a cross section of a filter construction suitable for carrying my invention into effect.

Fig. 2 is a longitudinal section thereof, on the line $s_2$—$s_2$, of Fig. 1.

Figs. 7 to 13 inclusive, indicate various forms in which my invention may be applied.

In Fig. 7, the filter is of the rectangular type with two parallel banks of filters cleaned by a cleaning element mounted on a car. Obviously more than two banks of filters may be used in the same filter tank.

In Fig. 8, the filter is circular in form. In this form the filter trays may be horizontal and separate, or as shown in Fig. 9, which is a section on line $s_{14}$ of Fig. 8, the filter tray may be continuous of spiral form.

Fig. 10 illustrates the use of multiple circular or spiral units in the same tank.

Figures 3, 4:
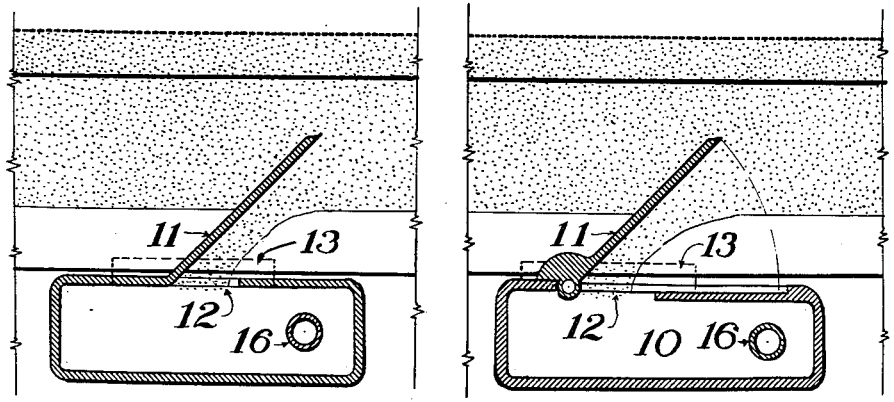
Figs. 3 and 4 are detail sectional views, showing a portion of a filter unit and two forms of a cleaning element in cooperative relation thereto.
Figure 11:
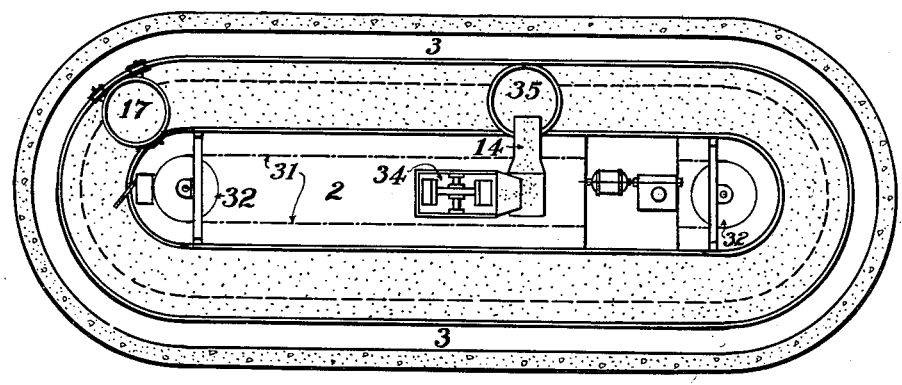
Figure 12:
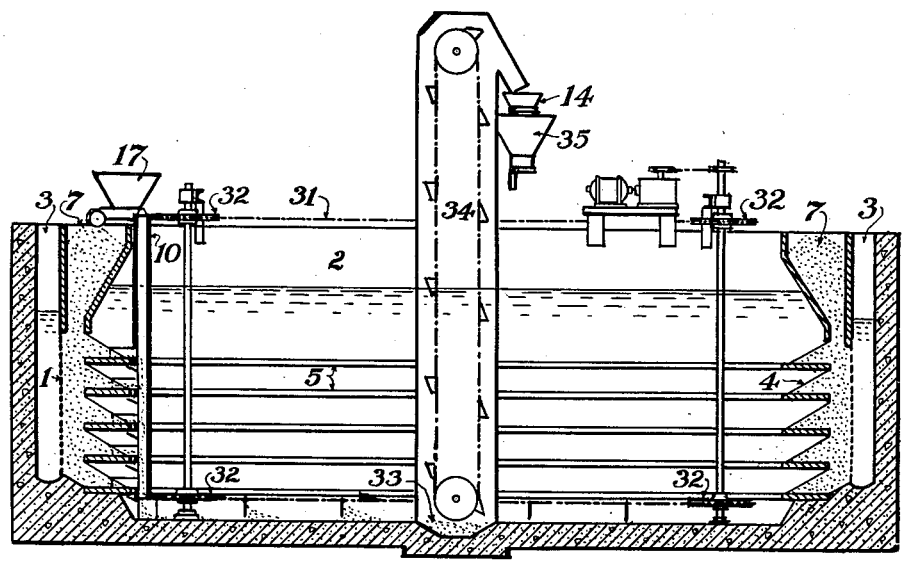
Figure 13:
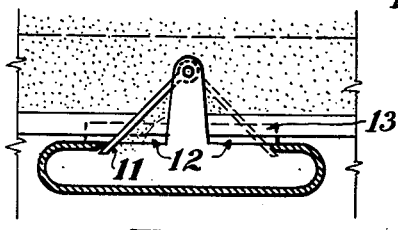

Figs. 11 and 12 illustrate a rectangular form with rounded ends in which the cleaning element is moved by chain drive rather than by a car, and Fig. 13 is an enlarged plan view, similar to Figs. 3 and 4 showing a scraper suitable for reciprocating motion of the cleaning element.

Referring now to the drawings, the filter may be built in any one of the various forms shown in Figs. 7 to 12 inclusive, preference usually depending upon requirements, conditions, etc., to be met in each particular case.

The filters shown are of the usual open top type, with bottom and side walls of any suitable or well known construction. Suitably arranged screens 1 divide the space within the filter into chambers 2 and 3, the chamber or chambers 2 being designed to contain the unfiltered liquid and the chamber 3, the filtered liquid.

Within each chamber 2 and interposed between the unfiltered liquid therein and the screen 1, is placed the filter media 4, such as sand or like material.

In the filter shown in Figs. 1 to 6 inclusive, the filter media is carried by suitably supported shelves 5, disposed one above the other, in vertical tiers and extending throughout the length of the chambers 2 and 3. These shelves are arranged at a suitable distance from the screen to provide a storage space 6, for sand between them, which is kept filled with filter media to supply the shelves. A continuous hopperlike formation 7 at the top, is provided for delivery of the supply material to the storage space 6. This material, fed downward by gravity, is forced outward on the shelf-like supports, forming a sloping surface between the shelves, the slope being determined by the angle of repose of the material. The shelves are so proportioned that the toe of the slope of the material will not reach the outer edge of the shelves and the media will therefore be retained by the shelves in a similar manner to earth embankments retained by cribbing.

Continuous flow of liquid from the chamber 2 through the filter media and screen to the chamber 3, results from the difference in head maintained between the liquids in the chambers, as indicated in Fig. 1. The sloping plane of the filter media presented for entrance of the unfiltered liquid, tends to shed the contained solids settling thereon and reduce the deposit to a minimum. Such solids as remain on the sloping planes tend to deposit at and near the toe of the incline. This natural accumulation simplifies the problem of cleaning the filter while it is in operation, as the bodily removal of the toe portion of the slope and to a slight depth beyond it, serves to keep the sand free and clear of objectionable deposit. In the usual operation of the filter, this removal of material occurs at such frequent intervals as to be practically continuous and as the material is removed, fresh clean sand from the storage space 6 is fed forward by gravity to replace the material taken away and maintain the filter bed formation.

A traveling cleaning element is employed to effect the above described removal of the solids and the filter media on which they are deposited and consists, as best shown in Figs. 1 and 2, of a car 8, running on tracks 9 on top of the filter walls. Depending upon the form of the filter, this cleaning element may travel either back and forth or continuously forward and be propelled by hand or power.

Extending downward from the underside of the car 8, to a point near the bottom of the unfiltered liquid chamber 2, there is a flat tubular casing 10 which is provided with a scraper 11 at each shelf level and an opening 12, in line with each scraper, through which the material removed from the shelf by the scraper passes into the casing 10, as shown more or less diagrammatically, in Figs. 2, 3 and 4. Projecting from the casing below each scraper, there is a lip 13 which extends under the shelf to prevent the escape of any of the removed material.

The scrapers may be offset as shown in Fig. 2 so that each shelf is cleaned immediately after the shelf above has been cleaned. This causes a practically continuous downward movement of clean sand in the sand storage space 6 as the cleaning element travels along the filter.

The material removed by the scrapers 11 drops to the bottom of the casing 10 from which it may be elevated and delivered to a separator and washer 14 on the platform 8 of the cleaning element by means of the suction pump 15 with suction pipe 16 or by air lift, bucket elevator or other well known means. In Figs. 1 and 2 the sand cleaner 14 indicated, is of the vibrating screen type in which vibrations or impulses electrically or mechanically imparted to the screen, impel the sand to one end from which it drops to the hopper 17. While the sand is moving along the screen, it is washed by water from spray pipe 18. The spent water after passing through the screen is collected in the hopper 19 which is drained by pipe 20 which discharges into the waste water trough 21 extending along the wall of the filter. The sand cleaner shown and described is illustrative only and several other types of sand washers are available and may be used. The hopper 17 is carried by the platform 8 of the cleaning element and as the latter travels along, the cleaned sand from the hopper 17 discharges into the upper hopper formation 7 of the storage space of the filter, to be fed downwards to the shelf beds to replace the material removed therefrom by the scrapers, as above described.

From the foregoing it will be seen that the entire body of filter media is kept in constant circulation and thoroughly cleansed in passing through the washer. Also that as the media and liquid being filtered, move in opposite directions, the action of the liquid will be to loosen rather than pack the media and maintain a condition required for free flow through the same.

Figure 5:
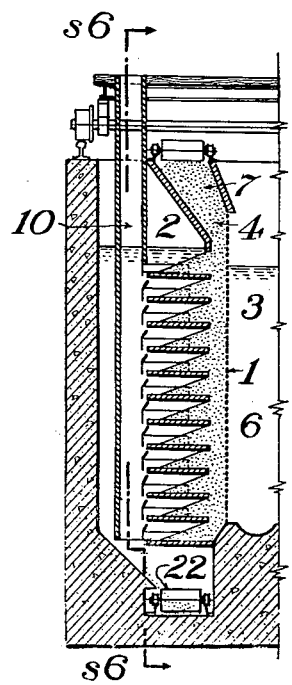
Fig. 5 is a cross section of a filter construction suitable for carrying my invention into effect with an alternate method for handling the filter media.
Figure 6:
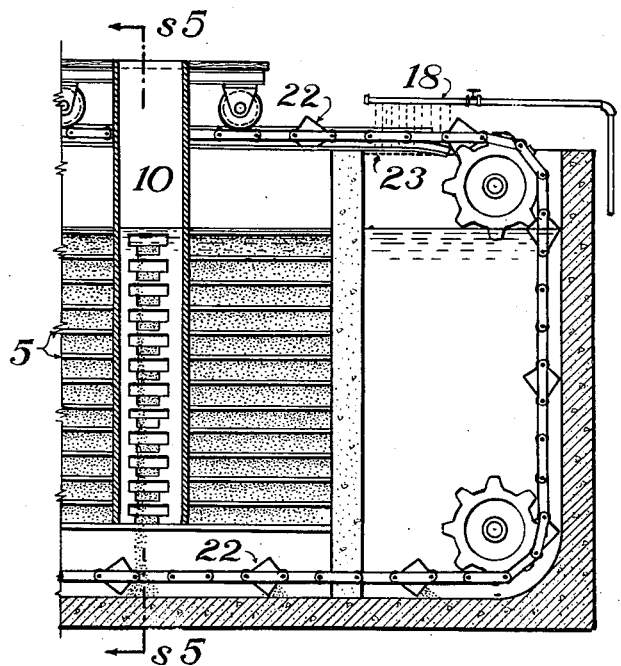
Fig. 6 is a longitudinal section on line $s_6$ of Fig. 5.

In the application shown in Figs. 5 and 6, the general arrangement is similar to that shown in Figs. 1 to 4 inclusive, but an alternate method is used for the collection and washing of the dirty sand removed from the trays. The tubular casing 10 in this application is open at the bottom so that the sand removed from the shelves drops through the open bottom of the casing 10 to the bottom of the unfiltered water compartment 2. A bucket conveyor 22 gathers the sand from the bottom of compartment 2 and lifts and conveys it to the cleaning screen 23 where it is washed by water from spray pipe 18. The bucket conveyor passes continuously over the hopper formation 7 and conveys the cleaned sand to this hopper.

Where the dirty sand or media is not to be washed and replaced but is to be otherwise disposed of, the general arrangement of Figs. 5 and 6 may be used, except that the conveyor would be arranged to deposit the dirty sand outside of the filter and to deposit fresh clean sand on the filter.

In some applications, particularly with small units, the dirty sand may be allowed to accumulate on the bottom of compartment 2 to be removed at intervals. Similarly clean sand may be applied to the hoppers 7 at intervals.

In the modification shown in plan in Fig. 7, there are two banks of filter trays 5 separating the unfiltered water compartment 2 and the filtered water compartment 3. The trays are supplied by fresh sand from the hoppers 7. The movable car 8 carries cleaning elements and pumps, which remove the fouled sand from the trays and discharge it to washers on car 8. The washed sand is returned to hoppers 7 over the filter trays.

Figs. 8 and 9 show the same type of filter as shown in Figs. 1, 2 and 7, with the exception that as viewed in plan, the trays are ring-shaped rather than rectangular. In this application, the outer annular compartment 2 is for the unfiltered water which flows through the multiple filter beds of ring form, into the filtered water compartment 3 in the center. The car 8 rotates, travelling on a circular track on the outer wall of the structure. In Fig. 9 the trays 5 are shown in the form of a continuous spiral ribbon. The unfiltered water in outer chamber 2 passes through the sand on trays 5 into the filtered water compartment 3. If the spiral type of tray is used, the scraper to peel off the fouled sand into the tubular casing 10 would be movable to traverse the continuous ribbon of the trays. The trays need not be of spiral form, but may be separate shelves horizontally disposed. It will be noted that the application as shown in Fig. 9 is similar to that shown in Fig. 1. The basic method of operation is the same, the only difference being the shape of the trays in plan.

Fig. 10 shows the use of several circular filters as shown in Figs. 8 and 9, placed in a rectangular basin, into which the unfiltered liquid is admitted and fills the space 2 outside of the filter units. Filtration is through the sand on the circular trays 5 and the filtered water is collected from the center filtered water compartments 3 of the circular filters and is carried off by the filtered water drains under the rectangular basin.

It will be noted that in all the forms described, the screen separating the sand from the filtered water compartment is accessible for cleaning.

The application shown in Fig. 11 is similar to those previously described except in the manner of moving the cleaning elements. Chains 31, carried by sprockets 32 are used, rather than a car, to move the cleaning elements. This form of construction may be used with any of the applications as shown in Figs. 1 to 6 inclusive. A continuous shelf as shown in the circular form in Fig. 9, may be used in the elongated form shown in Fig. 11. The chain drive in Fig. 11 may also be used to move the clean sand hopper 17 along the filters and to transport the dirty sand along the bottom of the unfiltered water compartment 2 to a point of collection for subsequent disposal or cleaning and return to the filters.

In Figs. 11 and 12, the dirty sand is conveyed to the hopper 33 from which it is raised by bucket elevator 34 to sand washer 14 which discharges into hopper 35. The moving hopper 17 is automatically filled from stationary hopper 35 as it passes under it.

Having described my invention, I claim:

1. The process of filtering liquids which consists first, in flowing the liquid horizontally through a body of granular filter media the entering surface of which is sloped to the angle of repose of the media to facilitate the discharge of the deposited solids, second, in removing the surface layer of the media to a predetermined depth with the solids deposited thereon, third, in collecting the material at the point of removal and conducting it, separated from the surrounding body of unfiltered liquid, outside of the filter, and fourth, in adding clean filtering material to the outlet portion of the filter bed and advancing it toward the inlet portion to simultaneously replace the material removed and restore the sloping surface, while the filter is in service and without interrupting the filtering operation.

2. The process of filtering liquids, as defined in claim 1, in which the surface layer removed from the filter media is freed of the deposited solids and returned to the filter while the latter is in operation to maintain the quantity of media employed against depletion.

3. The process of filtering liquids, as defined in claim 1, in which the surface layer removed from the filter media is freed from the deposited solids and is then returned to the filter and fed forward toward the inlet in opposition to the flow of liquid through the media to reform and maintain the same against depletion.

4. The process of filtering liquids, as defined in claim 1, in which the surface layer removed from the filter media is freed from the deposited solids and is then returned to the filter and fed toward the inlet by gravity in opposition to the flow of liquid through the media to reform and maintain the same against depletion.

5. In a filtering process in which the liquid is passed horizontally through a body of granular filter media and enters the same through a surface thereof that is sloped to the angle of repose of the media, the step of circulating the filter media while the filter is in operation, which consists in removing the surface material through which the unfiltered liquid enters the media, collecting the material as removed and conducting it, separated from the surrounding body of unfiltered liquid, outside the filter, then washing and returning such washed material to the outlet portion of the filter bed for advancement by its own weight toward the inlet portion and against the flow through the media to replace like removals and maintain the aforesaid inlet surface formation while the filter is in service and without interrupting the filtering operation.

6. The filtering process, as defined in claim 5, in which upon removal of the surface material of the media, an equal quantity of clean material is simultaneously fed forward from the outlet portion of the filter bed toward the inlet to replace that removed.

7. The process of filtering liquids, which consists first, in passing the liquid horizontally through a single unitary body of granular filter media arranged to provide entrance for the liquid at different levels sloped to the angle of repose of the media and second, in removing the exposed surface layer of the media at the different levels with the solids deposited thereon, then washing and returning such media freed of the solids to the outlet portion of the filter bed for advancement by its own weight toward the inlet to restore the sloping surfaces thereof and maintain the body of media against depletion while the filter is in service and without interrupting the filtering operation.

8. The process of filtering liquids, which consists first, in passing the liquid horizontally through a single unitary body of granular filter media arranged to provide entrance for the liquid through sloping surfaces of the media formed by the angle of repose thereof at different levels and passage through the media to a common outlet of multiple openings reduced to prevent escape of the filter media, second, in removing the exposed surface layer of the media at the different levels to a predetermined depth with the solids deposited thereon, and third, in collecting the material as it is removed, conducting the same separated from the unfiltered liquid outside the filter and freeing it from the contained solids, then returning it to the outlet portion of the filter beds for advancement by its own weight toward the inlet to simultaneously replace like removals while the filter is in service and without interrupting the filtering operation.

9. The process of filtering liquids, which consists first, in passing the liquid horizontally through a single unitary body of granular filter media arranged to provide entrance for the liquid at different levels leading to a common outlet of multiple openings reduced to prevent escape of the filter media, the liquid being entered at the different levels through surfaces of the media sloped to the angle of repose of the media to facilitate discharge of the solids from said surfaces, second, in removing the exposed surface layer of the media to a predetermined depth at the different levels with the solids deposited thereon and conducting the same separated from the unfiltered liquid outside the filter while the filter is in service, then washing and returning the removed media in bulk freed from the solids to the outlet portion of the filter beds for distribution to the different levels and advancement by its own weight toward the inlets to simultaneously replace like removals and maintain the sloped formation of the media without interrupting the filtering operation.

10. The process of filtering liquids, which consists in passing the liquid horizontally through a single unitary body of granular filter media arranged to provide entrance for the liquid at different levels through surfaces of the media sloped to the angle of repose thereof, simultaneously removing the exposed surface layer of the media at different levels to a predetermined depth with the solids deposited thereon, collecting the removed material in bulk separated from the unfiltered liquid, and washing and returning the removed media in bulk to the outlet portion of the filter beds for distribution by its own weight to the different levels to simultaneously replace like removals and maintain the formation of the media while the filter is in service and without interrupting the filtering operation.

11. The process, as defined in claim 10, in which the removal of the surface layer of the filter media at different levels is simultaneously effected at points relatively advanced one beyond the other to distribute the effect of such removals over an extended area of the media.

12. In a filter, a single unitary body of filter media, a suitable container for the media having openings in its side walls and horizontal shelves at the lower edge of the openings, the media being free to gravitate downwardly therein and pass through the openings to form vertically inclined entering surfaces on the shelves at different levels for the liquid to be filtered, the said surfaces being sloped to the angle of repose of the media and the flow of the entering liquid being substantially horizontal through the media, a common outlet for the liquid entering at different levels, the said outlet being formed of multiple openings reduced to prevent escape of the media through the same, and means for removing the surface layer of the media at the different levels with the solids deposited thereon by the liquid in entering the same, such removal causing an advance of clean material, by the aforesaid gravitating action of the body of the media, to simultaneously replace the material removed and reform the sloping surfaces at the different levels, while the filter is in service and without interrupting the filtering operation.

13. A filter, as defined in claim 12, in which the common outlet is provided by a screen forming a dividing wall between the body of filtered media and the filtered liquid.

14. A filter, as defined in claim 12, in which suitable apparatus is employed to collect the material as it is removed from the different levels, including means for conducting it separated from the surrounding body of unfiltered liquid and means for returning it freed of the solids to the body of the media in the filter, thereby maintaining constant circulation of the media and the mass thereof against depletion.

15. A filter, as defined in claim 12, in which the means employed to remove the material is provided with collecting means for such material at points advanced one beyond the other in the direction of movement of said removal means to distribute the effect of such removals over an extended area of the media.

16. A filter for liquids, comprising filter media contained in beds arranged at different levels one above the other with individual inlet and delivery provided for the beds, a filtered liquid compartment common to the several beds, a screen serving as a dividing wall between the beds and the filtered liquid compartment, a vertically disposed storage chamber between the beds and the screen through which chamber filter media is fed by gravity to the several beds in opposition to the flow of liquid through the same, a traveling cleaning element adapted to traverse the beds, the said cleaning element being provided with means adapted to remove the surface layer of the filter media with the solids deposited thereon and means for washing the media removed by the cleaning element and returning it to the storage chamber for distribution by its own weight to replace like removals from the beds while the filter is in service and without interrupting the filtering operation.

17. A filter, as defined in claim 16, in which there is associated with the cleaning element means for collecting and separating the material as it is removed from the surrounding body of unfiltered liquid and for delivering it outside of the filter.

WESTON GAVETT.